June 1, 1965 C. W. NEEFE 3,187,338
CORNEAL CONTACT LENS OF WIDE FITTING RANGE
WITH SINE CURVE CONCAVE SURFACE
Filed Feb. 19, 1962

INVENTOR.
Charles W. Neefe
BY

United States Patent Office 3,187,338
Patented June 1, 1965

3,187,338
CORNEAL CONTACT LENS OF WIDE FITTING RANGE WITH SINE CURVE CONCAVE SURFACE
Charles W. Neefe, Big Spring, Tex., assignor to Neefe-Hamilton Research Company, Big Spring, Tex.
Filed Feb. 19, 1962, Ser. No. 174,047
3 Claims. (Cl. 351—160)

The invention relates to a corneal contact lens of new design.

Corneal contact lenses, that is, lenses designed to cover the corneal region only of the eye, as now being used, have inner concave surfaces composed of spheres, segments of spheres or a central spherical segment surrounded by a zone of changing curvature. It is well known that the corneal area of the eye is not spherical. The radius of the cornea is longer toward the edge; the contour becomes increasingly flatter outwardly toward the limbus, also sections of the cornea measured vertically and horizontally will not have the same radius. This condition is termed astigmatism. To this completely nonspherical surface, contact lenses with spherical inner surfaces are difficult and sometimes impossible to fit.

The advantage of this new contact lens over the present types is its wide fitting range. All present types of contact lenses have concave surfaces which are spherical, or have segments of spheres, or have a spherical segment which must be fitted to a completely nonspherical cornea. The cornea is neither spherical nor consistent radially. This condition is termed astigmatism, and is present to some extent in every cornea. Also a cross section of the cornea is not spherical as its curve flattens near the edge. With present contact lenses having concave surfaces composed of spheres or segments of spheres, the lenses fit concentric to the cornea in its central area or in some types the edge fits concentric to the cornea. A concentric fit is most difficult to achieve since the lens is spherical and the cornea is every thing but spherical.

To overcome these difficulties, we have designed a contact lens with a unique aspherical concave surface which gives a wide latitude for fitting. This lens eliminates the difficulties encountered by the change in corneal curves which take place when contact lenses are worn for some time. In addition, and a most important factor, the central corneal flattening associated with many of the spherical type lenses is completely eliminated. This new lens can be fitted directly from the ophthalmometer reading of the cornea which equals the radius of this new lens at a point approximately two-thirds of the way from the center to the edge. The conclave surface of this lens has a continuous but gradual change from the center out to the edge, the center being of shorter radius than the flatter meridian of the central area of the cornea, the outer edge having an increasingly larger radius of curvature.

These and other objects of the present invention will be fully apparent from the following description when taken in conjunction with the annexed drawing, in which.

Figure 1:
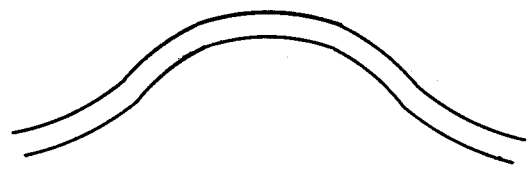
FIGURE 1 is a cross-sectional view of the cornea showing the longer radius near the limbus.
Figure 2:
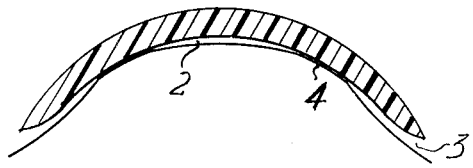
FIGURE 2 is a cross-sectional view of the cornea and a lens of the new improved aspheric type in the primary fitting position.

If the lens is fitted as directed, the center of the contact area will be at 4, FIGURE 2. If the cornea is flatter than anticipated, the center of contact will move toward the edge at 6, FIGURE 3. If the cornea is too strongly convex, the center of the contact area will move inward to point 5, FIGURE 4. In all the above cases, the lens will make a satisfactory physical fit with the cornea. The contact areas as shown at 4, FIGURE 2, and 6, FIGURE 3, and 5, FIGURE 4, are not point contacts because the rate of change of the lens is very slow and gradual, allowing the lens to be supported by, or to float on, the tear film separating it from the cornea.

Figure 5:
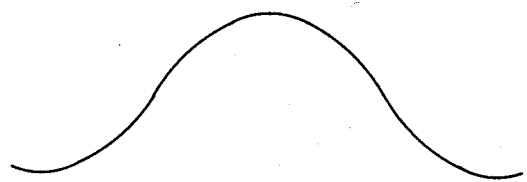
FIGURE 5 is a sine curve.

This aspheric surface differs from a sphere in that its central area is of shorter radius than a sphere of similar curvature and its edge is of larger radius than a sphere of similar curvature. FIGURE 5 shows a sine curve upon which this aspheric shape is based, the function of which is well known. The curve may be plotted on coordinates by assigning values to $x$ in the following algebraic equation: $y = \text{sine } x$. The amplitude of the curve may be reduced to 3 percent of the radius of the central area of the cornea and this variation then applied to the corneal radius to arrive at the aspheric curve, or the sine curve itself may be scaled to the cornea. Now, this is not to say that these are the only curves, ratio or embodiments which may be used without departing from the spirit of the present invention. These surfaces can be cut or ground and polished on the lens, or molds may be made and methyl methacrylate monomer cast over the molds to form the aspheric concave surfaces upon polymerization of the monomer.

Figure 3:
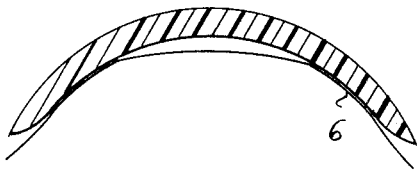
FIGURE 3 is a cross-sectional view of the cornea and lens of the new improved aspheric type fitted to a cornea of longer radius.
Figure 4:
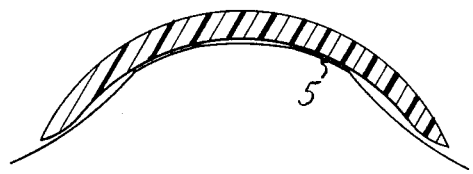
FIGURE 4 is a cross-sectional view of the cornea and a lens of the new improved aspheric type fitted to a cornea of shorter radius.

If the lens is fitted with too deep an inside surface, the lens will fit further out on the cornea, FIGURE 3. If the lens is fitted with too flat an inside surface, the lens will fit closer to the cornea, FIGURE 4. If the two fittings are within plus or minus 1.00 diopter, the lens will have a satisfactory fit. This is a great help in achieving a good comfortable and lasting fit. With this new system the power of the lens is controlled by the front surface of the lens and must be computed from the cornea itself and not the rear surface of the lens as it has an aspheric power. By using plastic with a refractive index equal or near the tear index the aspheric power is neutralized by the tear film contained between the rear aspheric surface and cornea. Also, the aspheric power and the astigmatism present in the cornea is neutralized by this tear film. The front surface of the lens is cut and polished to a true spherical surface. The lens may be cut or ground from methyl methacrylate or other suitable substance in the usual manner known to the optical trade.

The aspheric inside surface of this new type contact lens affords an increase flow of lachrymal fluid between the lens and the cornea. It is a well established fact that the cornea is dependent upon oxygen brought to its surface by the lachrymal fluid for its normal metabolism. Any contact lens which eliminates or greatly retards the flow of lachrymal fluids will interfere with corneal metabolism, due to oxygen starvation, and this condition cannot be tolerated for any extended period of time. The inner aspheric surface aids the flow of lachrymal fluid because its gradual increase of radius forms a tapered opening around the edge of the lens, as 3, FIGURE 2. This tapered opening acts as a pump. Under the action of the advancing eye lid, lachrymal fluid is forced inward and under the lens into area 2, FIGURE 2. In this way a change of fluid provides oxygen and fresh film of lachrymal fluid will at all times be present between the lens and cornea for lubrication and to prevent direct contact between the lens and corneal tissue.

The fitting of this lens is generally simplified by the wide fitting range of its aspheric inner surface. The only information required is the flattest radius of the central area of the cornea, the size of the cornea and the ophathalmic prescription needed by the patient. With this information, a lens may be made by the herein disclosed method which can be worn over long periods of time comfortably and without irritation or flattening of the central corneal area.

Various modifications, of course, can be made without departing from the spirit of this invention or the scope of the appended claims. It is understood that many slight variations of the basic curves, ratio and degrees thereof are obtainable which will yield a lens of the wide fitting altitude as disclosed herein. The constants set forth in this disclosure are given as examples and are in no way final or binding.

I claim:

1. A corneal contact lens of concavo-convex form in section, of a size to lie within the area defined by the limbus and having a concave surface of aspherical form from center to edge composed of a sine curve, the central area having a radius shorter than the cornea to which it is applied and the outer edge having a radius longer than the cornea to which it is applied, whereby the angle of contact between the lens and cornea will remain constant if the radius of the cornea is changed.

2. A corneal contact lens of concavo-convex form in section, of a size to lie within the area defined by the limbus, having a concave, aspheric surface whose curvature is a sine curve, and an outer area having a radius of curvature longer than the cornea to which the lens is applied, whereby a satisfactory fit will result if the cornea or contact lens is of a different radius than the radius designated as correct.

3. A corneal contact lens of concavo-convex form in section, of a size to lie within the area defined by the limbus, having a concave, aspheric surface whose curvature is a sine curve, and a central area having a radius of curvature shorter than the cornea to which the lens is applied, and an outer area having a radius of curvature longer than the cornea to which the lens is applied, whereby a satisfactory fit will result if the cornea or contact lens is of a different radius than the radius designated as correct.

References Cited by the Examiner

UNITED STATES PATENTS

| | | | |
|---|---|---|---|
| 2,510,438 | 6/50 | Tuohy | 88—54.5 |
| 2,544,246 | 3/51 | Butterfield | 88—54.5 |
| 2,809,556 | 10/57 | Hornstein | 88—54.5 |

OTHER REFERENCES

Bier, the Contour Lens, Article in The Optician, vol. 132, No. 3422, Nov. 2, 1956, pages 397–399.

DAVID H. RUBIN, *Primary Examiner.*